US007198153B2

(12) United States Patent
Shaffer

(10) Patent No.: US 7,198,153 B2
(45) Date of Patent: Apr. 3, 2007

(54) LIGHT STRING STORAGE AND HANGING SYSTEM AND METHOD

(76) Inventor: Kevin Shaffer, 820 S. Winding Rd., Dover, PA (US) 17315-2827

( * ) Notice: Subject to any disclaimer, the term of this patent is extended or adjusted under 35 U.S.C. 154(b) by 64 days.

(21) Appl. No.: 11/041,052

(22) Filed: Jan. 21, 2005

(65) Prior Publication Data

US 2005/0161359 A1 Jul. 28, 2005

Related U.S. Application Data

(60) Provisional application No. 60/538,586, filed on Jan. 23, 2004.

(51) Int. Cl.
*B65D 85/42* (2006.01)
*B65D 69/00* (2006.01)
*B65H 75/30* (2006.01)
*B62Q 3/04* (2006.01)

(52) U.S. Cl. .................. 206/419; 242/395.1; 206/420; 206/575; 362/362

(58) Field of Classification Search ................ 362/362, 362/365, 375, 387; 242/609.1, 588, 588.3; 206/418, 419
See application file for complete search history.

(56) References Cited

U.S. PATENT DOCUMENTS 5,064,067 A * 11/1991 McAllister et al. ......... 206/420
D375,251 S 11/1996 Stevens et al.
5,582,291 A 12/1996 Schroeder et al.
5,816,407 A * 10/1998 Daratony .................... 206/576
5,941,388 A * 8/1999 Spielberger ................. 206/419
6,398,148 B1 * 6/2002 Snow ...................... 242/395.1
6,467,623 B1 * 10/2002 Lewis et al. ................ 206/575
6,612,436 B1 * 9/2003 Zullo ......................... 206/391
6,918,557 B2 * 7/2005 Ast et al. ................. 242/388.6

* cited by examiner

*Primary Examiner*—Renee Luebke
*Assistant Examiner*—Evan Dzierzynski
(74) *Attorney, Agent, or Firm*—Timothy M. Barlow

(57) ABSTRACT

A light string storage and hanging system includes a support frame, having an upper end a lower end and a suspension hook attached to the upper end of the support frame. A light string spool is rotatably attached to the frame. The support frame may be a vertical support shaft and retainer to be used with an icicle light string spool, or a rectangular support frame for use with a standard light string spool. The light string spools include at least one notch or keeper to secure a light string to the spool. All of the aforementioned components can be stored is a lidded storage box capable of holding a plurality of spools of different types and a spool guard to prevent icicles light strings from tangling.

15 Claims, 3 Drawing Sheets

LIGHT STRING STORAGE AND HANGING SYSTEM AND METHOD

PRIORITY DATA

This application claims benefit of U.S. Provisional Patent Application Ser. No. 60/538,586 filed on Jan. 23, 2004.

BACKGROUND OF THE INVENTION

1. Field of the Invention

The present invention relates generally to storage containers and racks, and more specifically to a storage and hanging system and method for decorative light strings.

2. Description of Related Art

Light strings include strands of decorative lights that can be attached to houses, trees, and other objects. These decorative light strings, such as those used to brighten holidays and other festive occasions, present a unique challenge in the off-season, because they are so fragile. These light strings are fragile, and must be stored carefully and yet be ready to be hung easily without tangling or breakage.

Light strings, by definition, have long cords and numerous fragile light bulbs. Some kinds of light strings, such as icicle lights, have numerous small cords, or icicles, attached to the main cord. Each of the icicles must be handled carefully to prevent damage, but they are prone to damage and tangling due to their design. However, even the most basic standard light strings are barely less fragile than the icicle lights. Standard light strings don't have any icicles, but each light bulb is exposed and unprotected. The bulbs are likely to snag on so many things and each other that it is hot uncommon to have bulbs broken even with careful storage techniques. A system and method for preventing the bulbs and cord from snagging and tangling would make it easier to hang the light strings as well.

Racks have been used to store light strands for many years. The rack is a substantially flat piece of wood or plastic with numerous notches along the parallel edges. The notches engage the cords for the decorative light strings to hold them in place and prevent the light strings from slipping off. Many manufacturers use similar racks to keep new light strings untangled and unbroken from manufacturing to sale. Consumers often try to reuse the racks or make their own. There are some drawbacks to this. A large rack can hold several strands of light strings. These decorative light strings may have a total length of a hundred feet or more. This is very efficient use of space. However, the bulbs and cord of the innermost strands of the decorative lights on the rack are subject to ever-increasing amounts of pressure due to the additional strings layered on top. This frequently results in broken bulbs. Further, if the strands of decorative lights are wound too tightly, the top layers may be forced between the lower layers, causing jams, tangles, and damage.

Another method developed to store decorative light strings is a simple cylinder. However, the cylinders have the same problems as the racks. The top layers of decorative light strings are easily forced between the lower layers, or squeeze and crush the lower layers, resulting in tangles and damage, especially when too many light strings are placed on a single cylinder.

Many people try to solve the storage problem by attempting to replace the decorative light strings back into the original shipping container from the manufacturer. The goal is to try to make the decorative lights strings as compact and protected as when they were first purchased. This is an impossible task to perform by hand. The manufacturer's packing is accomplished by a machine, using an automated process with great uniformity. It is not recommended that the user imitate factory packing by hand. Over, time, the tight bending required can result in kinks and broken wires in the cords.

None of these devices make it easy to hang the lights after storage. Hanging light strings, particularly those outside, can be a challenging and even hazardous task. Usually, the homeowner uses a ladder to reach gutters, eaves and rooflines. If the light strings don't have clips, then the homeowner will need to attach hooks or other fasteners to the house or gutters to hold the light strings. At the top of a ladder, the last thing he needs problems with are tangled or damaged lights, thus many users will try to remove the tangles on the ground. In the absence of something better, a homeowner may unwind a light string to its full length and place it under the gutter or eaves where it is to be attached. This invites trouble as the bulbs are subject to tangling with trees, shrubbery and the ladder. Optimally, the homeowner should be able to bring entire light strings up to the work area at once, in a compact, tangle-free package, and have them readily available without having to maintain a constant grip on them. He should be able to deploy them quickly and easily without breakage or tangles.

Thus, what is needed is a way to pack a plurality of decorative light strings into a single container that virtually eliminates tangles and subsequent breakage, and that provides a quick, easy and safe way to hang the lights without damage.

SUMMARY OF THE INVENTION

The device is a light string storage and hanging system and method, which includes a suspension hook, a support frame and a plurality of spools to accept a plurality of decorative light strings. This assembly fits into a storage box that may include a spool guard to cover one or more standard spools.

One or a plurality of spools are placed onto the support frame to allow a user to hang or retrieve decorative light strings, such as Christmas lights, from a house or other structure. The hook may be attached to a rain gutter or other suitable part of a house or other structure. When the device is hanging from the suspension hook, the support frame may be oriented in a vertical or horizontal position. The user can choose the orientation most suitable to his particular situation.

In use, the user stores light strings on the spools. The light strings are wrapped around the spools and the free ends of the light strings can be secured to the spools via slots for the plugs or cords to go into. The device makes hanging the light strings easy. The user places one or more spools onto the support shaft and hangs it from the rain gutter or other suitable structure. The user may work from the roof or from a ladder to easily reach the spool and light strings. To start, the user hooks the device near the end of the rain gutter and attaches an end of a light string at the end of a gutter. The user then slides the hook along the gutter a few feet at a time, keeping the device within reach, attaching the light string as he goes, until he reaches the end of the gutter or light string. The light string automatically unwinds from the spool as the user proceeds along the gutter. If the user is working from a ladder, he must move the ladder periodically, but he does not need to worry about carrying the light strings up and down with him. Nor does he have to worry about becoming tangled in a light string dangling close by the ladder or on the ground. The light strings stay attached to the gutter or suspended from the support shaft on a spool. Thus the user can quickly and easily attach entire light strings without dangerous acrobatics up on a ladder. Light string removal is the reverse operation and is just as easy. The user should need to use only one hand for all operations. This leaves the other hand available to firmly grip the ladder for safety and stability. Light string damage can be controlled or minimized by limiting the size of the spools or the number of light strings stored on a spool.

Several spools can fit onto the support frame, permitting the user to segregate different colors and styles of lights for separate decorative uses. The user can place a plurality of spools onto the support frame for storage. A top-loading storage box can accept the loaded spools and then the box's lid can be latched closed. The lid includes a carrying handle. The support frame may be removed and placed inside the box to facilitate storage.

Accordingly, it is a principal object of the invention to disclose a light string storage and hanging system and method that allows one or a plurality of decorative light strings to be hung without unnecessary risk to the user or damage to the light strings.

It is another object of the invention to teach a light string storage and hanging system and method that allows one or a plurality of decorative light strings to be coiled onto a spool without unnecessary risk to the user or damage to the light strings.

Still another object of the invention is to teach a light string storage and hanging system and method that virtually eliminates damaged decorative light strings due to tangles.

Yet another object of the invention is to disclose a light string storage and hanging system and method that permits multiple sets of decorative light strings to be stored immediately adjacent to one another without damage or tangling.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE DRAWINGS

Figure 1:
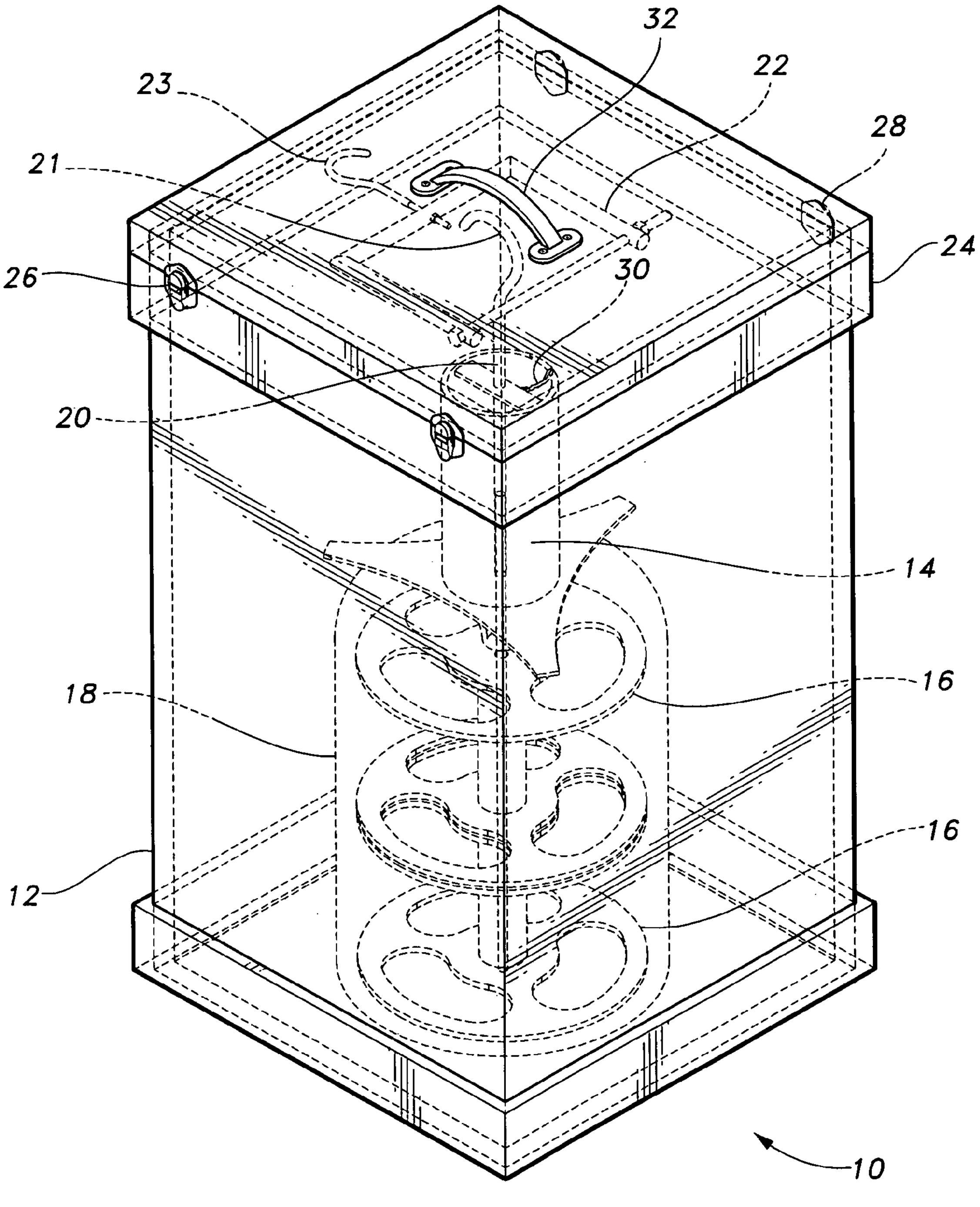
FIG. 1 is a perspective view of a light string storage and hanging system, inside a storage container, according to the present invention.

FIG. 1 shows a perspective view of the light string storage and hanging system 10 inside a storage container 12. A plurality of spools of different types can be stored inside the container 12. An icicle spool 14 is shown atop a pair of standard spools 16. A spool guard 18 is placed over the standard spools 16. The spool guard 18 resembles a bell and may have a hole at the top center for a vertical support frame 20 to extend through. A rectangular support frame 22 is shown removably attached inside the lid 24. The rectangular support frame 22 can be a press-fit into a specially-formed recess in the lid, or other means, such as hook-and-loop fasteners may be used. The vertical support frame 20 is shown extending down through the spools 14, 16 and spool guard 18 and includes a hook 21 to allow the user to hang the device where the light strings will be hung. The rectangular support frame 22 includes a support hook 23 as well as a removable spindle 25 to allow quick and easy spool 16 changes. The storage container 12, or box, may be made with a plurality of chambers for holding a large number of spools 14, 16.

The lid is shown attached to the box 12 with latches 26 on one side and a pair of hinges 28 on the opposite side. However, the hinges 28 can be omitted and replaced with latches 26 so that the lid 24can be fully removed. In another embodiment, the lid 24 includes at least one storage compartment (not shown) and a handle 32. One or more storage compartments could be used to hold a number of useful items, such as spare bulbs, fuses, wiring tools and pliers. These finishing touches make the light string deployment system 10 into a self-contained kit for dealing with virtually every problem likely to be encountered while hanging the light strings. A notch 30 is provided in the spools 14, 16 to hold the end of the light string cord in place.

Figure 2:
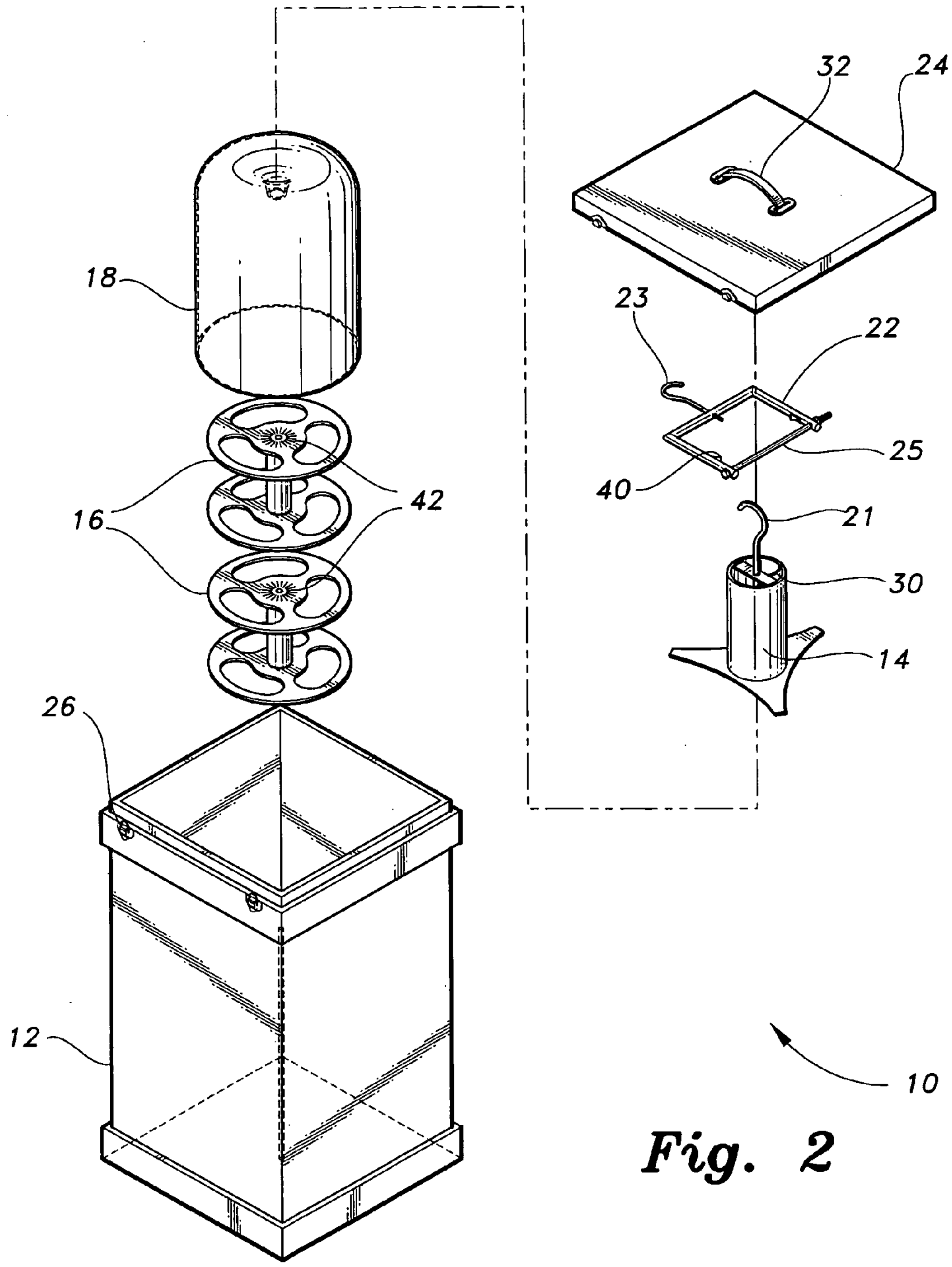
FIG. 2 is a perspective view of the light string storage and hanging system, according to the present invention.

FIG. 2 is an expanded view of the light string storage and hanging system 10. A plurality of standard spools 16 fit neatly beneath the spool guard 18. The dimensions of the box 12 dictate how many spool fit inside. The user must avoid the temptation to place too many light strings onto the spools 14, 16. Damage to the light strings can result. The spool guard 18 is particularly effective in preventing tangles and damage when an icicle spool 14 is stacked atop the standard spools 16. The icicle light strings are stored with the main cord wrapped around the icicle spool 14. The "icicles" are free to hang loosely from the main cord to prevent damage to the bulbs from being wound tightly around the spool 14. The icicle spool 14 has a few spokes at the bottom end, but it is mostly open around its bottom, providing a place for the icicles to hang freely. The "icicles" cannot become tangled with the main cord of the icicle light string. The spool guard 18 keeps the icicles from contacting, and becoming entangled with, the standard light strings on the standard spools 16, stored below. Thus, the icicles are isolated will not tangle with the standard light strings. The spool guard 18 can be used even if there are no standard spools 16 stored below. In that case, the spool guard 18 raises the icicle spools 14 above the bottom of the storage box 12 and minimizes the risk of the icicles becoming entangled with each other. Icicles can be over two feet in length, thus it is important to keep them separated. The storage box 12 can be made tall enough to accommodate the longest icicle lights.

The vertical support frame 20 can be made long enough to hold more than one icicle spool 14. The icicles from the uppermost icicle spool 14 would simply be draped over the lower icicle spools 14. Thus, the user could have all of his icicle lights available at the work site at once. Of course it would be a very good idea to use the spool guard 18 to raise the icicle spool 14 in the box 12 to prevent the icicles from becoming tangled or damaged, even if nonstandard spools 16 are in the storage box 12.

Figure 3:
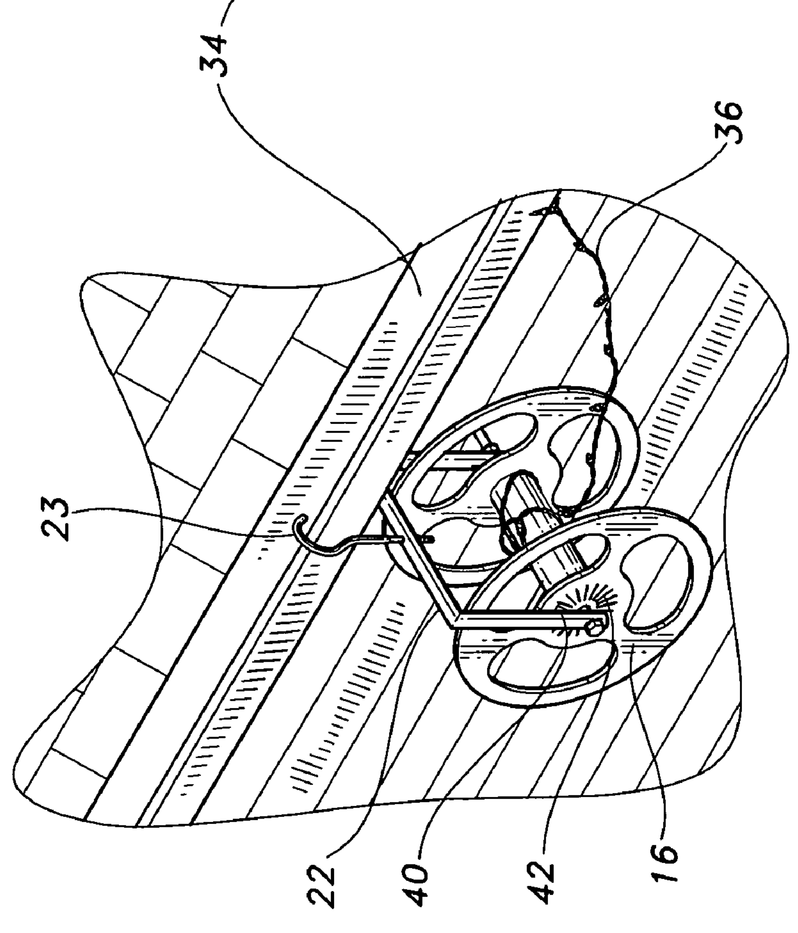
FIG. 3 is a perspective view of the light string storage and hanging system hanging from a rain gutter, according to the present invention.

FIG. 3 shows a standard light string 36 being deployed from a standard spool 16. The rectangular support frame 22 is used with the standard spools 16. The hook 23 is attached to a rain gutter 34 or other suitable feature. The user attaches the standard light string 36 to the rain gutter 34 in a plurality of locations. The user slides the hook 23 and the rectangular support frame 22 along the rain gutter 34 until the spool 16 is empty or the end of the gutter 34 is reached. The user does not need to lay the entire length of the light string 36 below the gutter 34 on the ground. The light string 36 is kept above the ground the entire time, away from hazards and damage. The standard spool 16 has a disc on each end of the main cylinder. Thus, the standard light strings can be distributed over a large area, without risk of falling off of the spool 16. This helps to eliminate damage to the light strings. Notice that the frame 22 includes a pawl 40 adjacent to the spindle 25. The spool 16 includes a plurality of ratchet notches 42. The pawl 40 engages the ratchet notches 42 to provide resistance against the spool 16 spinning freely. The notches are of a profile that allows movement in both directions, but only when the user applies sufficient force. The pawl 40 should be made of a flexible material that will flex and permit rotation of the spool 16, but only when the user wants to.

Figure 4:
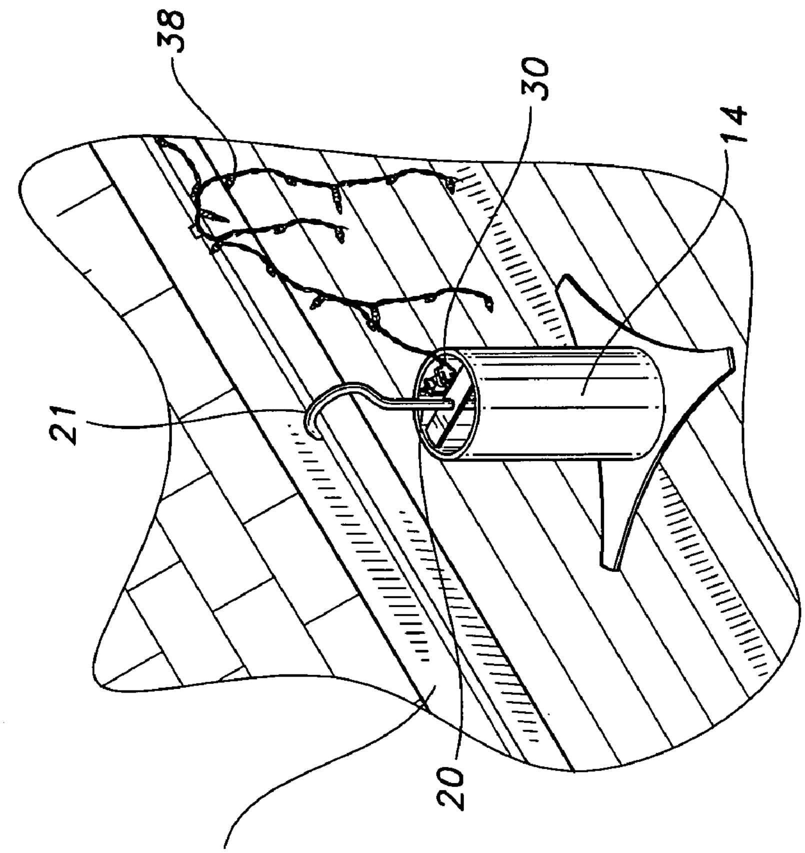
FIG. 4 is a perspective view of the light string storage and hanging system hanging from a rain gutter, according to the present invention.

FIG. 4 shows an icicle light string 38 being deployed from an icicle spool 14. The vertical support frame 20 is used with the icicle spools 14. The hook 21 is attached to a rain gutter 34 or other suitable feature. The user attaches the icicle light string 38 to the rain gutter 34 in a plurality of locations. Only the main cord of the icicle light string 38 is attached to the gutter 34. The icicles are free to dangle. The user slides the hook 21 and the vertical support frame 20 along the rain gutter 34, attaching the icicle light string as he goes, until the spool 14 is empty or the end of the gutter 34 is reached. The user does not need to lay the entire length of the light string 38 below the gutter 34 on the ground. The icicle light string 38 is kept above the ground the entire time, away from hazards and damage. The icicle light spools 14 are held onto the vertical support frame 20 with a retainer (not shown). The retainer is a large nut, or similar device, that attaches easily to the vertical support frame 20, but will not easily loosen as the icicle light spool 14 turns about its axis. Similar to the rectangular frame 22 and standard spool 16, the retainer and icicle spool 14 may include a pawl 40 and ratchet notches 42 to prevent the spool 14 from turning except when the user directs. The end of the icicle light string 38 is shown engaged in the notch 30 at the edge of the spool 14. The plug end of the light string 38 fits neatly inside the spool 14 to keep the light string 38 in place.

Storage of the light strings 36, 38 onto the spools 14, 16 is the reverse operation. The user hangs the support frame 20, 22 near the end of the light string 36, 38. The end of the light string 36, 38 is placed into the notch 30 to hold it in place. The user detaches the light string 36, 38 in short lengths and slides the support frame 20, 22 to provide some slack in the light string 36, 38. The user then turns the spool 14, 16 to wind the light string 36, 38 onto the spool 14, 16. It is important to keep the length of detached light string 36, 38 rather short, to prevent the user from reaching too far and creating a hazard, and to prevent the weight of the detached light strings 36, 38 from spontaneously unwinding the light strings 36, 38 from the spools 14, 16.

I claim:

1. A light string deployment system, comprising:

a support frame and axle, the frame having an upper end and a lower end and the axle attached to the frame at the lower end of the frame;

a suspension hook attached to the upper end of the frame; and a light string spool rotatably attached around the axle, the axle extending completely through the center of the spool and providing rotational support to the spool when it is suspended from the hook.

2. The light string deployment system of claim 1, where the support frame comprises a vertical support shaft and retainer, where the vertical support shaft extends completely through the center of the spool and provides rotational support to the spool when it is suspended from the hook.

3. The light string deployment system of claim 1, where the support frame comprises a generally rectangular shape having a horizontally-oriented axle, where the horizontal axle extends completely through the center of the spool and provides rotational support to the spool when it is suspended from the hook.

4. The light string deployment system of claim 1, where the light string spool comprises at least one keeper to secure a light string.

5. The light string deployment system of claim 1, further comprising a ratchet and pawl mechanism incorporated into the light string spool and the support frame.

6. The A light string deployment system of claim 1, further comprising:

a storage box;

a lid attached to the storage box;

at least one standard light string spool inside the box;

at least one icicle light string spool inside the box; and a support frame removably attached inside the box;

a spool guard removably attached inside the box over the at least one standard spool.

7. The light string deployment system of claim 6, where the support frame comprises a vertical support shaft removably inserted into a rotational axis of the at least one icicle light spool.

8. The light string deployment system of claim 6, where the support frame comprises a generally rectangular frame removably attached inside the lid.

9. The light string deployment system of claim 6, where the lid is removably attached to the box.

10. The light string deployment system of claim 6, where the lid is hingedly attached to the box.

11. The light string deployment system of claim 6, where the lid comprises at least one storage compartment.

12. The light string deployment system of claim 6, where the lid comprises a handle.

13. A method of deploying light strings, comprising the steps of:

(a) attaching a full light string spool to a support frame;

(b) suspending the support frame from an elevated feature;

(c) attaching a free end of a light string to the elevated feature;

(d) sliding the support frame along the elevated feature a predetermined distance;

(e) attaching the light string to the elevated feature every predetermined distance; and (f) returning to step (d) until the light string is empty.

14. The method of deploying light strings of claim 13, where the elevated feature of step (b) comprises a rain gutter.

15. The method of deploying light strings of claim 13, further comprising the steps of:

(g) removing the empty light string spool; and (h) returning to step (a).

* * * * *